US008886573B2

(12) United States Patent
Delling et al.

(10) Patent No.: US 8,886,573 B2
(45) Date of Patent: Nov. 11, 2014

(54) DETERMINING OPTIMUM GRAPH BISECTION USING A TREE AND PRUNING THE TREE USING A PACKING LOWER BOUND

(75) Inventors: Daniel Delling, Mountain View, CA (US); Andrew V. Goldberg, Redwood City, CA (US); Ilya Razenshteyn, Nizhniy Novgorod (RU); Renato F. Werneck, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 13/438,849

(22) Filed: Apr. 4, 2012

(65) Prior Publication Data

US 2013/0268549 A1 Oct. 10, 2013

(51) Int. Cl.
*G06F 15/18* (2006.01)
(52) U.S. Cl.
USPC .......................................................... 706/12
(58) Field of Classification Search
USPC ......................................... 706/12, 45, 52, 62
See application file for complete search history.

(56) References Cited

U.S. PATENT DOCUMENTS

| 5,469,367 | A | * | 11/1995 | Puri et al. ....................... 716/104 |
| 5,748,844 | A | | 5/1998 | Marks |
| 6,594,624 | B1 | | 7/2003 | Curet |
| 6,826,549 | B1 | | 11/2004 | Marks et al. |
| 7,010,789 | B1 | * | 3/2006 | Kimelman et al. ........... 718/100 |
| 7,672,516 | B2 | | 3/2010 | Cremers et al. |
| 7,788,210 | B2 | | 8/2010 | Lang et al. |
| 7,840,319 | B2 | * | 11/2010 | Zhong ............................. 701/25 |
| 2003/0154003 | A1 | * | 8/2003 | Eker et al. ..................... 700/266 |
| 2004/0193349 | A1 | * | 9/2004 | Flann et al. ..................... 701/50 |
| 2013/0226538 | A1 | * | 8/2013 | Donde et al. ...................... 703/2 |

OTHER PUBLICATIONS

Some et al., Parallel Inferencing for OWL Knowledge Bases, 2008, IEEE, pp. 75-82.*
Arora, et al., "Geometry, Flows, and Graph-Partitioning Algorithms", Retrieved at <<http://www.cs.princeton.edu/~arora/pubs/arvcacm.pdf>>, Communications of the ACM, vol. 51, Issue 10, Oct. 2008, pp. 96-105.
Feige, et al., "A Polylogarithmic Approximation of the Minimum Bisection", Retrieved at <<http://ieeexplore.ieee.org/stamp/stamp.jsp?tp=&arnumber=892070>>, 41st Annual Symposium on Foundations of Computer Science, 2000, pp. 105-115.

(Continued)

*Primary Examiner* — David Vincent
(74) *Attorney, Agent, or Firm* — Micah Goldsmith; Glen Johnson; Micky Minhas (57) ABSTRACT

Techniques are described for graph partitioning, and in particular, graph bisection. A lower bound is provided that is computed in near-linear time. These bounds may be used to determine optimum solutions to real-world graphs with many vertices (e.g., more than a million for road networks, or tens of thousands for VLSI and mesh instances). A packing lower bound technique determines lower bounds in a branch-and-bound tree, reducing the number of tree nodes. Techniques are employed to assign vertices without branching on them, again reducing the size of the tree. Decomposition is provided to translate an input graph into less complex subproblems. The decomposition boosts performance and determines the optimum solution to an input by solving subproblems independently. The subproblems can be solved independently using a branch-and-bound approach to determine the optimum bisection.

16 Claims, 9 Drawing Sheets

(56) References Cited

OTHER PUBLICATIONS

Ding, et al., "A min-max cut algorithm for graph partitioning and data clustering", Retrieved at <<http://ieeexplore.ieee.org/stamp/stamp.jsp?tp=&arnumber=989507>>, Proceedings IEEE International Conference on Data Mining (ICDM), 2001, pp. 107-114.

Armbruster, Michael, "Branch-and-Cut for a Semidefinite Relaxation of Large-Scale Minimum Bisection Problems", Retrieved at <<http://www.qucosa.de/fileadmin/data/qucosa/documents/5421/data/diss.pdf>>, 2007, pp. 242.

Armbruster, Michael, "Graph Bisection and Equipartition", Retrieved at <<http://www.tu-chemnitz.de/mathematik/discrete/armbruster/diss/>>, 2007, p. 1.

Armbruster, Michael, "A Comparative Study of Linear and Semidefinite Branch-and-Cut Methods for Solving the Minimum Graph Bisection Problem", Retrieved at <<http://www-user.tu-chemnitz.de/~helmberg/ipco08.pdf>>, in IPCO, LNCS 5035, 2008, pp. 112-124.

Bader, et al., "10th DIMACS Implementation Challenge—Graph Partitioning and Graph Clustering", Retrieved at <<www.cc.gatech.edu/dimacs10/index.shtml>>, 2011, pp. 3.

Barnard, et al., "Fast Multilevel Implementation of Recursive Spectral Bisection for Partitioning Unstructured Problems", Retrieved at <<http://laurel.datsi.fi.upm.es/~atorre/lib/exe/fetch.php?id=universidad%3Adoctorado&cache=cache&media=universidad:barnard94fast.pdf>>, Concurrency and Computation: Practice and Experience, vol. 6, No. 2, Mar. 22, 1994, pp. 101-117.

Bhatt, et al., "A Framework for Solving VLSI Graph Layout Problems", Retrieved at <<http://citeseer.ist.psu.edu/viewdoc/download;jsessionid=B069A2ED16BEF8C54AE6A129824C9738?doi=10.1.1.17.3685&rep=rep1&type=pdf>>, Journal of Computer and System Sciences, vol. 28 No. 2, 1984, pp. 300-343.

Budiu, et al., "DryadOpt: Branch-and-Bound on Distributed Data-Parallel Execution Engines", Retrieved at <<http://budiu.info/work/ipdps11.pdf>>, in IPDPS, 2011, pp. 1278-1289.

Chardaire, et al., "A PROBE-based Heuristic for Graph Partitioning", Retrieved at <<http://ieeexplore.ieee.org/stamp/stamp.jsp?tp=&arnumber=4358219>>, IEEE Transactions on Computers, vol. 56, No. 12, 2007, pp. 1707-1720.

Chataigner, et al., "Approximation and Inaproximability Results on Balanced Connected Partitions of Graphs", Retrieved at <<http://www.dmtcs.org/dmtcs-ojs/index.php/dmtcs/article/download/656/1822>>, Discrete Mathematics and Theoretical Computer Science, vol. 9, No. 1, 2007, pp. 177-192.

Delling, et al., "Customizable Route Planning", Retrieved at <<http://research.microsoft.com/pubs/145688/crp-sea.pdf>>, in SEA, LNCS, 6630, Springer, 2011, pp. 376-387.

Delling, et al., "Graph Partitioning with Natural Cuts", Retrieved at <<http://ieeexplore.ieee.org/stamp/stamp.jsp?tp=&arnumber=6012851>>, in IPDPS, IEEE, 2011, pp. 1135-1146.

Demaine, et al., "Contraction Decomposition in H-Minor-Free Graphs and Algorithmic Applications", Retrieved at <<http://www-math.mit.edu/~hajiagha/HMinorContraction.pdf>>, in STOC, 2011, pp. 441-450.

Feldmann, et al., "An O(N4) Time Algorithm to Compute the Bisection Width of Solid Grid Graphs", Retrieved at <<ftp://ftp.inf.ethz.ch/pub/publications/tech-reports/7xx/730.pdf>>, in ESA, LNCS 6942, 2011, pp. 143-154.

Felner, Ariel, "Finding Optimal Solutions to the Graph Partitioning Problem with Heuristic Search", Retrieved at <<http://fohs.bgu.ac.il/research/upload/3686/newgpp.pdf>>, Annals of Mathematics and Artificial Intelligence, vol. 45, Nos. 3-4, 2005, pp. 29.

Gendron, et al., "Parallel Branch-and-bound Algorithms: Survey and Synthesis", Retrieved at <<http://www.iro.umontreal.ca/~gendron/Pisa/References/BB/Gendron94.pdf>>, Operations Research, vol. 42, No. 6, 1994, pp. 1042-1066.

Goldberg, et al., "Maximum Flows by Incremental Breadth-First Search", Retrieved at <<http://www.cs.tau.ac.il/~sagihed/ibfs/ibfs.pdf>>, in ESA, LNCS 6942, 2011, pp. 457-468.

Goldberg, et al., "A New Approach to the Maximum-Flow Problem", Retrieved at <<http://www.cs.princeton.edu/courses/archive/fall05/cos528/handouts/A%20New%20Approach.pdf>>, Journal of the ACM, vol. 35, No. 4, 1988, pp. 921-940.

Hager, et al., "An Exact Algorithm for Graph Partitioning", Retrieved at <<http://www.math.ufl.edu/~hager/papers/GP/cqb.pdf>>, 2011, pp. 23.

Hein, et al., "An Inverse Power Method for Nonlinear Eigenproblems with Applications in 1—Spectral Clustering and Sparse PCA", Retrieved at <<http://arxiv.org/PS_cache/arxiv/pdf/1012/1012.0774v1.pdf>>, in NIPS, 2010, pp. 847-855.

Hendrickson, et al., "A Multilevel Algorithm for Partitioning Graphs", Retrieved at <<http://ieeexplore.ieee.org/stamp/stamp.jsp?tp=&arnumber=1383164>>, in SC, ACM Press, 1995, pp. 2.

Jansen, et al., "Polynomial Time Approximation Schemes for MAXBISECTION on Planar and Geometric Graphs", Retrieved at <<http://theory.cs.uni-bonn.de/ftp/reports/cs-reports/2000/85219-CS.pdf>>, SIAM Journal on Computing, vol. 35, 2005, pp. 13.

Karypis, et al., "A Fast and Highly Quality Multilevel Scheme for Partitioning Irregular Graphs", Retrieved at <<http://glaros.dtc.umn.edu/gkhome/fetch/papers/mISIAMSC99.pdf>>, SIAM Journal on Scientific Computing, vol. 20, No. 1, 1999, pp. 359-392.

Koch, et al., "SteinLib: An Updated Library on Steiner Tree Problems in Graphs", Retrieved at <<http://typo.zib.de/koch/biblio/paper/kochmartinvoss2001_pp.pdf>>, Technical Report 00-37, 2000, pp. 37.

Kwatra, et al., "Graphcut Textures: Image and Video Synthesis using Graph Cuts", Retrieved at <<http://www.cc.gatech.edu/~turk/my_papers/graph_cuts.pdf>>, ACM Transactions on Graphics, vol. 22, 2003, pp. 277-286.

Land, et al., "An Automatic Method of Solving Discrete Programming Problems", Retrieved at <<http://jmvidal.cse.sc.edu/library/land60a.pdf>>, Econometrica, vol. 28, No. 3, 1960, pp. 497-520.

Pellegrini, et al., "SCOTCH: A Software Package for Static Mapping by Dual Recursive Bipartitioning of Process and Architecture Graphs", Retrieved at <<https://www.labri.fr/perso/pelegrin/papers/scotch_hpcn96_mapping.ps.gz>>, in High-Performance Computing and Networking, LNCS 1067, Springer, 1996, pp. 493-498.

Racke, Harald, "Optimal Hierarchical Decompositions for Congestion Minimization in Networks", Retrieved at <<http://www.dcs.warwick.ac.uk/~harry/pdf/opthierarchical.pdf>>, in STOC, ACM Press, 2008, pp. 255-263.

Sander, et al., "Efficient Traversal of Mesh Edges using Adjacency Primitives", Retrieved at <<http://citeseerx.ist.psu.edu/viewdoc/download;jsessionid=B98CF963A4C818211C8C07610EDCC3FF?doi=10.1.1.146.2915&rep=rep1&type=pdf>>, ACM Transactions on Graphics, vol. 27, No. 144, 2008, pp. 1-144.

Sanders, et al., "Distributed Evolutionary Graph Partitioning", Retrieved at <<http://arxiv.org/PS_cache/arxiv/pdf/1110/1110.0477v1.pdf>>, in ALENEX, SIAM, 2012, pp. 21.

Sellmann, et al., "Multicommodity Flow Approximation Used for Exact Graph Partitioning", Retrieved at <<http://www.cs.brown.edu/research/pubs/pdfs/2003/Sellmann-2003-MFA.pdf>>, in ESA, LNCS 2832, 2003, pp. 752-764.

Sensen, Norbert, "Lower Bounds and Exact Algorithms for the Graph Partitioning Problem Using Multicommodity Flows", Retrieved at <<http://citeseerx.ist.psu.edu/viewdoc/download?doi=10.1.1.21.9176&rep=rep1&type=pdf>>, in ESA, LNCS 2161, 2001, pp. 14.

Shi, et al., "Normalized Cuts and Image Segmentation", Retrieved at <<http://ieeexplore.ieee.org/stamp/stamp.jsp?tp=&arnumber=868688>>, IEEE Transactions on Pattern Analysis and Machine Intelligence, vol. 22, No. 8, 2000, pp. 888-905.

Sleator, et al., "A Data Structure for Dynamic Trees", Retrieved at <<http://www.cs.cmu.edu/afs/cs.cmu.edu/user/sleator/www/papers/dynamic-trees.pdf>>, Journal of Computer and System Sciences, vol. 26, No. 3, 1983, pp. 362-391.

Soper, et al., "A Combined Evolutionary Search and Multilevel Optimization Approach to Graph Partitioning", Retrieved at <<http://staffweb.cms.gre.ac.uk/~c.walshaw/papers/fulltext/SoperJoGO04.pdf>>, Journal of Global Optimization, vol. 29, No. 2, 2004, pp. 225-241.

Soper, et al., "The Graph Partitioning Archive", Retrieved at <<http://staffweb.cms.gre.ac.uk/~c.walshaw/partition/>>, The Graph Partitioning Archive, 2004, pp. 11.

(56) References Cited

OTHER PUBLICATIONS

Walshaw, et al., "JOSTLE: Parallel Multilevel Graph-Partitioning Software—An Overview", Retrieved at <<http://citeseerx.ist.psu.edu/viewdoc/download?doi=10.1.1.184.5642&rep=rep1&type=pdf>>, in F. Magoules, editor, Mesh Partitioning Techniques and Domain Decomposition Techniques, Civil-Comp Ltd., 2007, pp. 27-58.

Wu, et al., "An Optimal Graph Theoretic Approach to Data Clustering: Theory and its Application to Image Segmentation", Retrieved at <<http://www.cse.sc.edu/~songwang/csce790/Suppl/WuLeahy.pdf>>, IEEE Transactions on Pattern Analysis and Machine Intelligence, vol. 15, No. 11, 1993, pp. 1101-1113.

"Graph Partitioning With Natural Cuts", U.S. Appl. No. 13/011,940, filed Jan. 24, 2011, pp. 28.

\* cited by examiner

DETERMINING OPTIMUM GRAPH BISECTION USING A TREE AND PRUNING THE TREE USING A PACKING LOWER BOUND

BACKGROUND

The minimum graph bisection problem is a well known problem that seeks to partition a graph into two equally-sized cells while minimizing the number of edges between them. More particularly, the input to the minimum graph bisection problem is an undirected, unweighted graph G=(V, E), and its goal is to partition V into two sets A and B such that |A|, |B|≤⌈|V|/2⌉, and the number of edges between A and B (the cut size) is minimized. This combinatorial optimization problem is a case of graph partitioning which asks for arbitrarily many cells. It has many applications, including image processing, computer vision, divide-and-conquer algorithms, VLSI circuit layout, distributed computing, and route planning.

Known software libraries (e.g., METIS, SCOTCH, JOSTLE, etc.) solve the graph partitioning problem but the quality of the obtained solutions is often unacceptable. Heuristics directed to particular graph classes, such as DibaP (for meshes) and PUNCH (for road networks), are also known. These techniques cannot prove optimality or provide approximation guarantees, and do not perform well unless imbalance is allowed.

There is much literature on computing exact solutions to the graph bisection and partitioning problems, mostly using the branch-and-bound framework. These techniques can only solve instances of moderate size (with hundreds or a few thousand vertices) to optimality, even after a few hours of processing.

SUMMARY

Techniques are described for graph partitioning, and in particular, graph bisection. A combinatorial lower bound is provided that is computed in near-linear time. These bounds may be used to determine optimum solutions to real-world graphs with many vertices (e.g., more than a million for road networks, or tens of thousands for VLSI and mesh instances).

In an implementation, a packing lower bound technique determines lower bounds in a branch-and-bound tree, reducing the number of tree nodes. Techniques are employed to assign vertices without branching on them, again reducing the size of the tree. When branching is necessary, the branching vertex is chosen according to branching rules tailored to the packing lower bounds.

In an implementation, decomposition is provided to translate an input graph into less complex subproblems. The decomposition techniques boost performance and determine the optimum solution to an input by solving subproblems independently. The subproblems can be solved independently using a branch-and-bound approach described herein to determine the optimum bisection.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
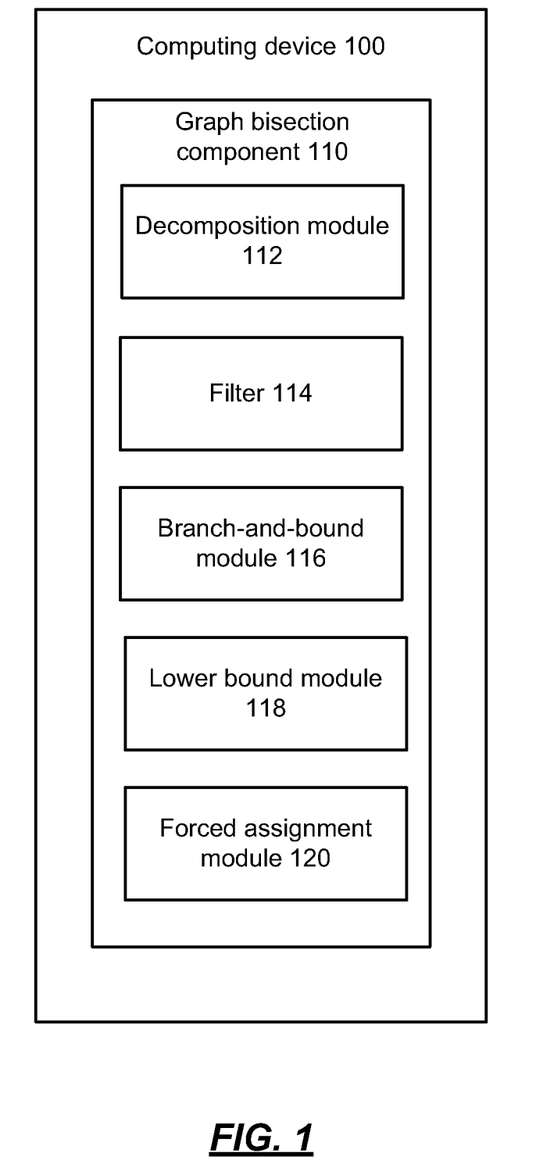
FIG. 1 shows an example of a computing environment in which aspects and embodiments may be potentially exploited.

FIG. 1 shows an example of a computing environment in which aspects and embodiments may be potentially exploited. A computing device 100 includes a network interface card (not shown) facilitating communications over a communications medium. Example computing devices include personal computers (PCs), mobile communication devices, etc. In some implementations, the computing device 100 may include a desktop personal computer, workstation, laptop, smart phone, PDA (personal digital assistant), cell phone, or any WAP-enabled device or any other computing device capable of interfacing directly or indirectly with a network. An example computing device 100 is described with respect to the computing device 1100 of FIG. 11, for example.

The computing device 100 comprises a graph bisection component 110 which may perform the graph partitioning described herein. Although implementations described herein are directed to graph bisection, it is contemplated that the techniques described herein may be used to partition a graph into any number of sections or partitions.

The graph bisection component 110 may comprise modules that perform various techniques described herein. A decomposition module 112 may be used to reduce an input graph into multiple subproblems that are less complex to solve. A filter 114 may be used to filter the subproblems to identify vertices of the input graph that that are well-connected to the rest of the graph, and therefore better branching candidates. A branch-and-bound module 116 uses the branch-and-bound technique, generating a search tree to solve the graph bisection problem. A lower bound module 118 may be used to compute lower bounds for each subproblem and a forced assignment module 120 may be used to force vertex assignments, as described further herein.

The modules of the graph bisection component 110 may be used independently of each other, or in conjunction with each other, depending on the implementation, and may perform various alternative and/or additional techniques as described further herein.

The computing device 100 may communicate with a local area network (not shown) via a physical connection. Alternatively, the computing device 100 may communicate with the local area network via a wireless wide area network or wireless local area network media, or via other communications media. The network may be a variety of network types including the public switched telephone network (PSTN), a cellular telephone network (e.g., 3G, 4G, CDMA, etc), and a packet switched network (e.g., the Internet). Any type of network and/or network interface may be used for the network. The user of the computing device 100, as a result of the supported network medium, is able to access network resources, typically through the use of a browser application running on the computing device 100. The browser application facilitates communication with a remote network over, for example, the Internet.

As described further herein, the graph bisection component 110 can perform graph partitioning (e.g., bisecting) and provide results to the graph partitioning problem on any graph. The term "cut" is used herein to denote a set of edges that separates the graph into two or more regions. It is contemplated that graph partitioning as described herein may be used with any application requiring balanced graph cuts.

To visualize methods contemplated herein, it is helpful to represent the input (an abstract graph with vertices and undirected edges) as points with connecting segments. Vertices correspond to locations or points, and edges correspond to segments between Locations. The edges may be weighted according any criteria about the corresponding segment. For manipulation by computing devices, graphs may be stored in a contiguous block of computer memory as a collection of records, each record representing a single graph node or edge along with associated data.

As used herein, $G=(V, E)$ denotes an input graph, with $n=|V|$ vertices and $m=|E|$ edges. Each vertex $v \in V$ may have an associated integral weight, denoted by $w(v)$, and each edge $e \in E$ has an associated integral cost $c(e)$. W denotes the sum of all the integral weights. A partition of G is a partition of V, i.e., a set of subsets of V which are disjoint and whose union is V. Each such subset is referred to as a cell, whose weight is defined as the sum of the weights of its vertices. The cost of a partition is the sum of the costs of all edges whose endpoints belong to different cells. A bisection is a partition into two cells. A bisection is $\epsilon$-balanced if each cell has weight at most $(1+\epsilon)\lceil W/2 \rceil$. If $\epsilon=0$, the partition is balanced. The minimum graph bisection problem is that of finding the minimum-cost balanced bisection.

Unless otherwise noted herein, the unweighted, balanced version of the problem is considered, where $w(v)=1$ for all $v \in V$, $c(e)=1$ for all $e \in E$, and $\epsilon=0$. G is therefore partitioned into two cells, each with weight at most $\lceil n/2 \rceil$, while minimizing the number of edges between cells. As described herein, these techniques can be generalized to handle less restricted inputs.

Figure 2:
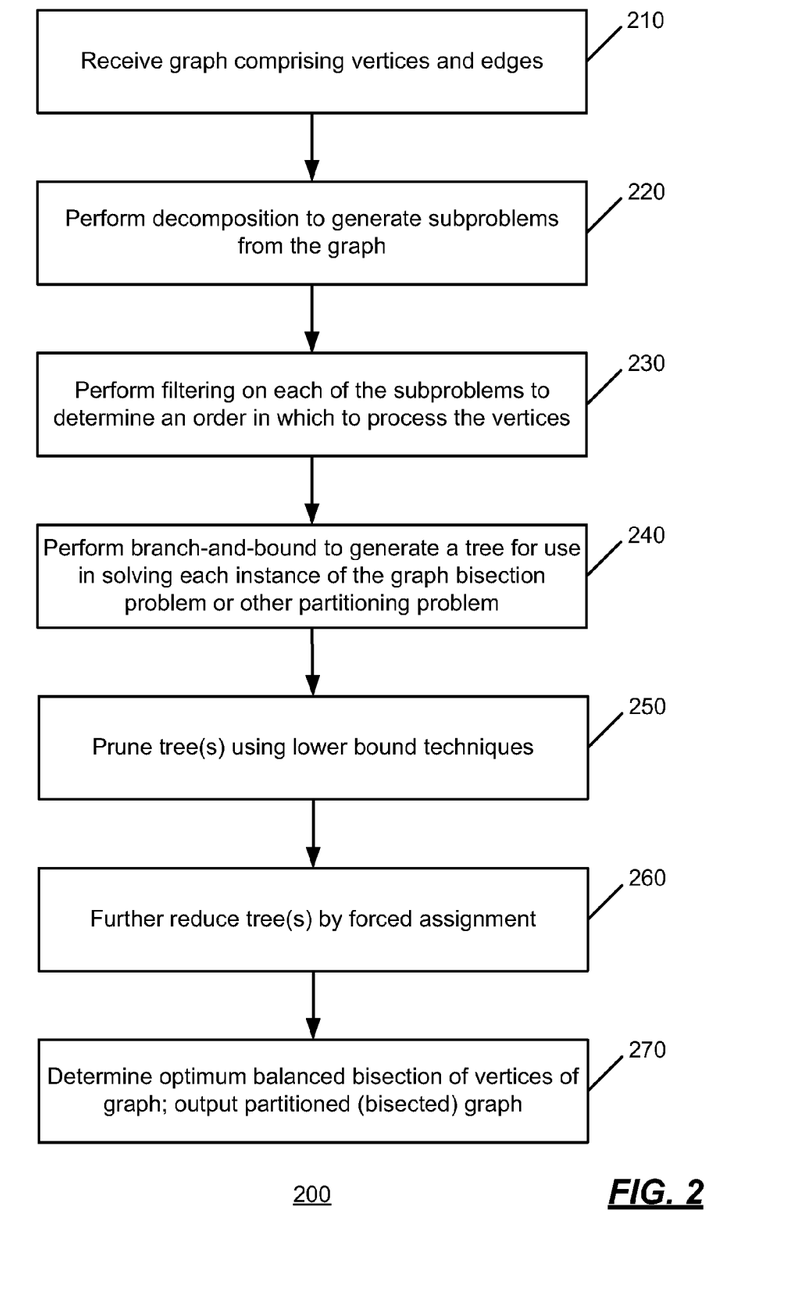
FIG. 2 is an operational flow of an implementation of a method which may be used in graph partitioning.

FIG. 2 is an operational flow of an implementation of a method 200 which may be used in graph partitioning. At 210, an input graph $G=(V,E)$ is received at the computing device 100. The input graph may be received from storage and/or a user or system administrator. Decomposition may be performed on the input graph at 220. As described further herein (e.g., with respect to FIG. 10), decomposition may be used to generate subproblems of the original graph bisection (or partitioning) problem using the input graph. Filtering may be performed on each of the subproblems at 230 (e.g., described further with respect to FIG. 9) to determine an order in which to process the vertices. The filtering reduces the size of the graph (e.g., the subproblems) and preserves the general overall structure of the graph (e.g., the subproblems).

At 240, the branch-and-bound technique is used to generate a tree for use in solving each instance of the graph bisection problem (or other partitioning problem). At 250, lower bounds may be determined and the tree(s) may be pruned (e.g., described further with respect to FIGS. 3-7). At 260, the tree(s) may be further reduced using forced assignments of one or more vertices (e.g., described further with respect to FIGS. 8A-8C)). An optimum balanced bisection of the vertices of the graph may be determined at 270, as described further herein. The partitioned (i.e., bisected) graph may be outputted (e.g., provided to the user and/or storage and/or an application for processing).

It is contemplated that the techniques of the method 200 may be used independently of each other, or in conjunction with each other, depending on the implementation. Restricted versions can also be used to find heuristic solutions.

In an implementation that may be used for graph partitioning, the input graph may be received or otherwise read at a computing device, and decomposition may be performed, similar to operations 210 and 220, respectively. Then for each subproblem created by the decomposition, filtering is performed (similar to 230), followed by multiple calls to a function "Solve" to process each individual subproblem. Let S be the set of open subproblems available (initially containing a single problem). While S is not empty, call the function "Solve" on S (referred herein as "Solve(S)"). Solve(S) is defined as follows: (1) remove a problem P from S, (2) compute a lower bound for P, (3) if P is at least as high as the best best known U upper bound, return, (4) perform forced assignments, and (5) pick a branching node v, generate two subproblems of P (assigning v to A or B), and add them both to S.

Branch-and-bound is a technique that performs an implicit enumeration by dividing a problem into two or more simpler subproblems, solving them recursively, and picking the best solution found. Each node of a branch-and-bound tree corresponds to a distinct subproblem. In a minimization context, the technique keeps a global upper bound U on the solution of the original problem, which can be updated as the algorithm determines improved solutions. To process a node in the tree, first compute a lower bound L on any solution to the corresponding subproblem. If the lower bound L≥the upper bound U, prune the node because it cannot lead to a better solution. Otherwise, branch to create two or more simpler subproblems.

In the case of graph bisection, each node of a branch-and-bound tree corresponds to a partial assignment $(A, B)$, where $A, B \subseteq V$ and $A \cap B = \emptyset$. The vertices in A or B are assigned, and all others are free (or unassigned). This node represents the valid bisections $(A+, B+)$ that are extensions of $(A, B)$, i.e., such that $A \subseteq A+$ and $B \subseteq B+$. In particular, the root node, which represents all valid bisections, has the form $(A, B)=(\{v\}, \emptyset)$. Note that the root can fix an arbitrary vertex v to one cell to break symmetry.

To process an arbitrary node $(A, B)$, a lower bound $L(A, B)$ is computed on the value of any extension $(A+, B+)$ of $(A, B)$. In an implementation, combinatorial bounds are used. In particular, the well-known flow bound may be used: the minimum s-t cut (maximum s-t flow) between A and B. It is a valid lower bound because any extension $(A+, B+)$ separates A from B. If the minimum cut s-t is balanced, the node can be pruned and the upper bound U may be updated. Otherwise, a free vertex v may be chosen and branched on, generating subproblems $(A \cup \{v\}, B)$ and $(A, B \cup \{v\})$.

The flow lower bound works well when A and B have similar sizes; even in this case, however, the corresponding minimum cuts are often far from balanced, with one side containing many more vertices than the other. This makes the flow bound weak by itself. To overcome these issues, a packing lower bound may be used.

In an implementation of a packing lower bound, let (A, B) be a partial assignment. To make it a balanced bisection, at least $(n/2)-|A|$ free vertices are assigned to A, resulting in an extended set A+ (similar for B). For each possible extension A+ of A, consider the maximum flow f(A+) between B and A+. Let f* be the minimum such flow value (over all possible A+); f* is a lower bound on the value of any bisection consistent with (A, B). Finding f* exactly is expensive; instead, a technique is described to compute a lower bound for f*.

Figure 3:
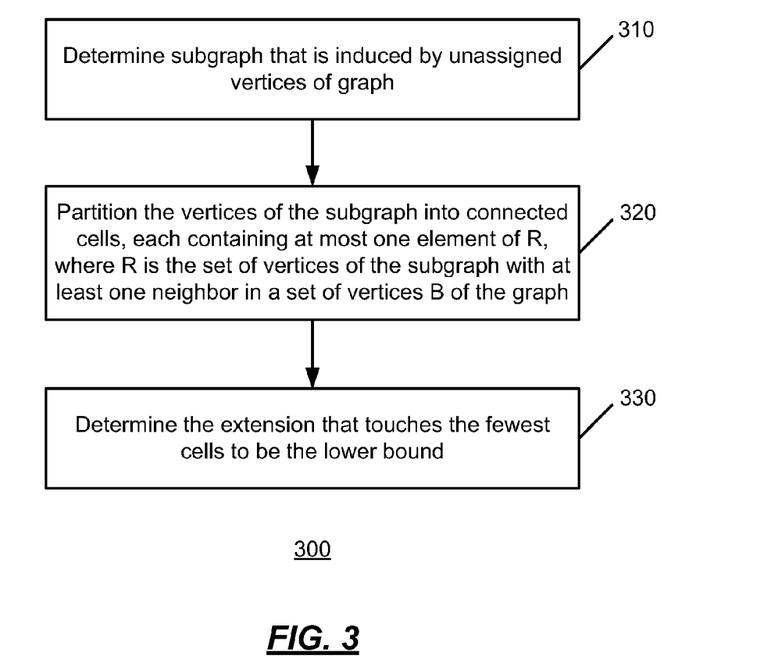
FIG. 3 is an operational flow of an implementation of a packing lower bound method.

FIG. 3 is an operational flow of an implementation of a packing lower bound method 300. At 310, a subgraph is determined that is induced by the unassigned vertices of a graph G. Let $G'=G\setminus(A\cup B)$ be the subgraph of G induced by the vertices that are currently unassigned, and let R be the set of vertices of G' with at least one neighbor in B (in G).

At 320, the vertices of the subgraph are partitioned into connected cells, each containing at most one element of R. Continuing with the example, partition the vertices in G' into connected cells, each containing at most one element of R. Any such partition is valid; better lower bounds are obtained if the cells containing elements in R are as large as possible and have roughly the same size. A cell C is nontrivial if it contains exactly one element from R; this element is the root of the cell and denoted by r(C). Cells with no element from R are trivial.

At 330, the extension that touches the fewest cells is determined to be the lower bound. Thus, with respect to the example, A+ is a valid extension of A, and c(A+) is the number of nontrivial cells hit by A+. Then c(A+) is a lower bound on the maximum flow f(B, A+) from B to A+. A lower bound is to be obtained on any possible extension A+ of A. One may be obtained by determining the extension that gives the lowest possible bound (for a fixed partition into connected cells). This extension may be built with a greedy packing algorithm.

For an implementation of a greedy packing algorithm, first pick all vertices in trivial cells; because these cells are not associated with paths, they do not increase the lower bound. From this point on, pick vertices from nontrivial cells. Since the lower bound increases by one regardless of the number of vertices picked in a cell, it makes sense to pick entire cells at once (after one vertex is picked, others in the cell are free—they do not increase the bound). In an implementation, cells are selected in decreasing order of size, stopping when the sum of the sizes of all picked cells (trivial and nontrivial) is at least $(n/2)-|A|$. Thus, the greedy packing algorithm determines a lower bound on the value of any bisection consistent with (A, B).

Figure 4A:
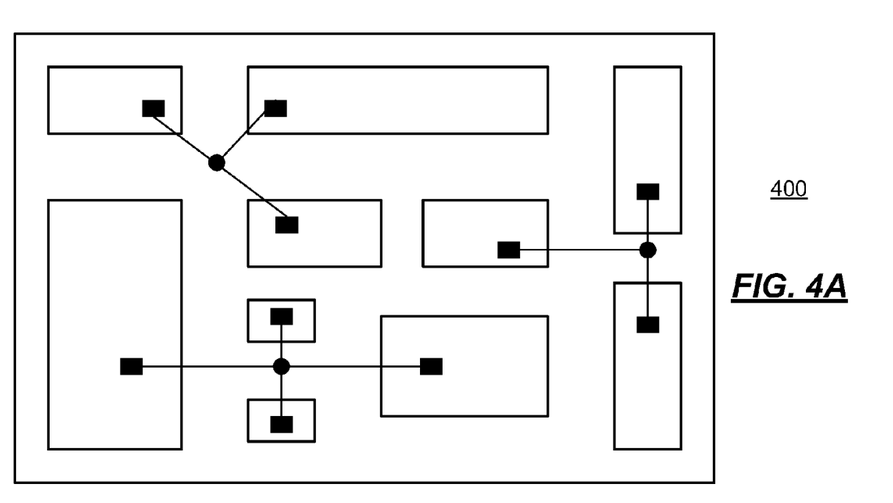
FIGS. 4A-4C are diagrams showing examples of a packing bound.
Figure 4B:
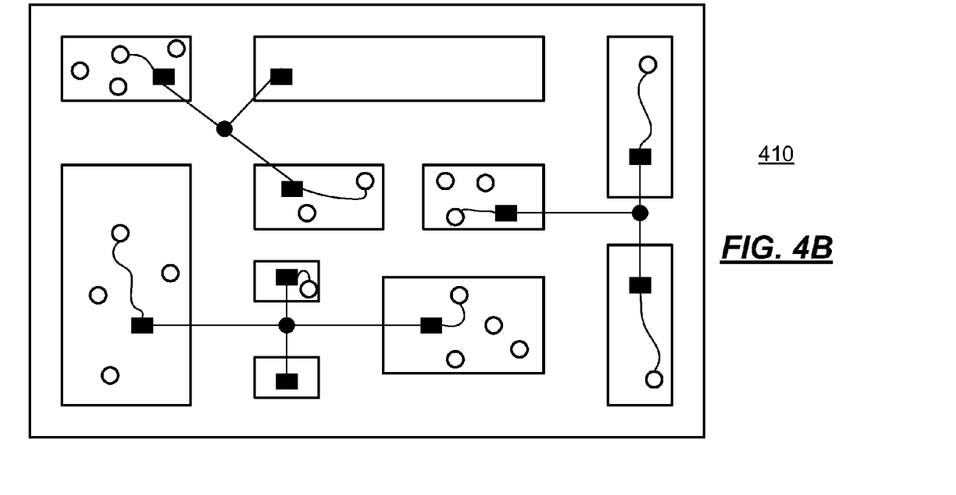
Figure 4C:
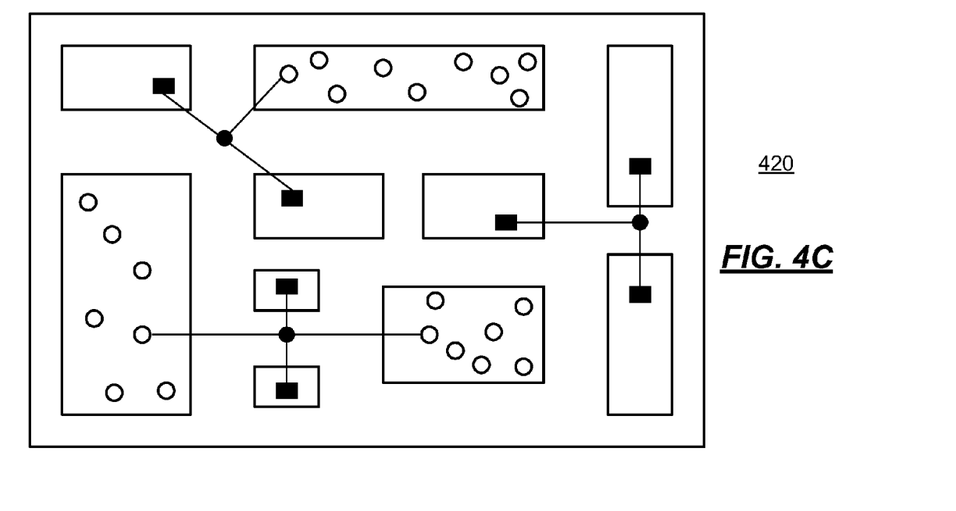

FIGS. 4A-4C are diagrams showing examples of a packing bound. Filled circles are vertices in B, and their free neighbors (filled squares) form a set R. In the diagram 400 of FIG. 4A, the free vertices are partitioned into connected cells, each with at most one element of R. In the diagram 410 of FIG. 4B, given any extension A+ (hollow circles), the number of nontrivial cells it touches is a lower bound on the minimum (B, A+) cut. In the diagram 420 of FIG. 4C, the extension A+ that hits the fewest cells (as determined by the greedy packing algorithm) is a lower bound on any valid extension.

Note that the packing lower bound is valid for any partition, but its quality depends strongly on which one is chosen. In an implementation, the partition is chosen that forces the worst-case extension A+ to hit as many nontrivial cells as possible. This means minimizing the total size of the trivial cells, and making the nontrivial cells have sizes as similar as possible.

A first heuristic is a constructive algorithm that builds an initial partition. Starting from |R| unit cells (each with one element of R), in each operation it adds a vertex to a cell whose current size is minimum. This technique can be implemented in linear time by keeping with each cell C a list E+(C) of potential expansion edges, i.e., edges (v, w) such that $v \in C$ and $w \notin C$. Vertices that are not reachable from R are assigned to trivial cells. As the algorithm progresses, some cells will run out of expansion edges, as the neighboring vertices will already be taken. This may lead to very unbalanced solutions.

To improve the partition, a second heuristic may be used: a local search routine that makes neighboring cells more balanced by moving vertices between them. To do so efficiently, it maintains a spanning tree for each nontrivial cell C, rooted at r(C). Initially, this is the tree built by a constructive algorithm.

Figure 5:
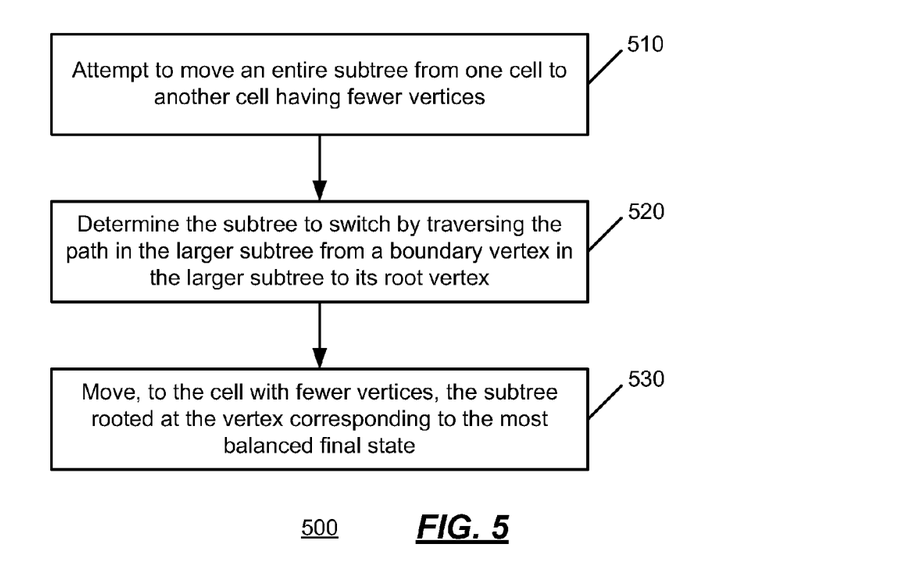
FIG. 5 is an operational flow of an implementation of a local search method which may be used in graph bisection and partitioning.

FIG. 5 is an operational flow of an implementation of a local search method 500 which may be used in graph bisection and partitioning. At 510, an attempt is made to move an entire subtree from one cell to another cell having fewer vertices. At 520, it is determined which subtree of the cell to switch to the other cell. This may be performed by traversing the path in the larger subtree from a boundary vertex to its root vertex. At 530, the subtree that is rooted at the vertex corresponding to the most balanced final state is moved from its initial cell to the cell with the fewer vertices.

In an implementation, the local search works by moving entire subtrees between neighboring cells. It processes one boundary edge at a time. Consider one such edge (v, w), with $v \in C_1$ and $w \in C_2$. Without loss of generality, cell $C_1$ has more vertices than $C_2$. To improve the solution, attempt to move an entire subtree from $C_1$ to $C_2$. Find the subtree to switch by traversing the path (in the spanning tree of $C_1$, the largest cell) from v to $r(C_1)$.

Figure 6A:
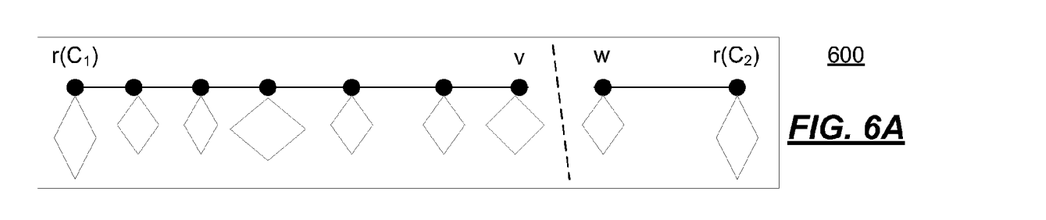
FIGS. 6A and 6B are diagrams showing examples of packing local search.
Figure 6B:
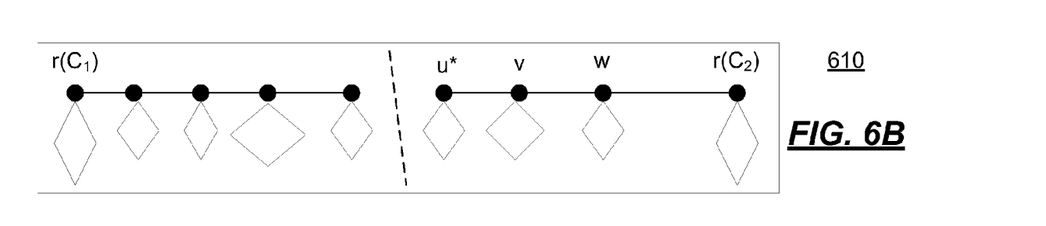

FIGS. 6A and 6B are diagrams showing examples of packing local search. In the diagram 600 of FIG. 6A, the boundary edge (v, w) determines a path between cells $C_1$ and $C_2$ (the diamond shapes in the Figures are subtrees). In the diagram 610 of FIG. 6B, splitting the path at a different point leads to a more balanced partition. Each vertex u on the path is associated with a possible move: removing the subtree rooted at u from $C_1$ and inserting it into $C_2$. Among these, let u be the vertex corresponding to the most balanced final state (in which the sizes of $C_1$ and $C_2$ would be closest). If this is more balanced than the current state, then switch. The local search runs until a local optimum, when no improving switch exists. To implement it efficiently, keep track of boundary edges and subtree sizes.

Although two lower bounds have been obtained, based on packing and flows, they cannot simply be added to obtain a unified lower bound, since they may interfere with one another. In an implementation, to combine the bounds, compute the flow bound, and compute a packing bound that takes the flow into account.

Figure 7:
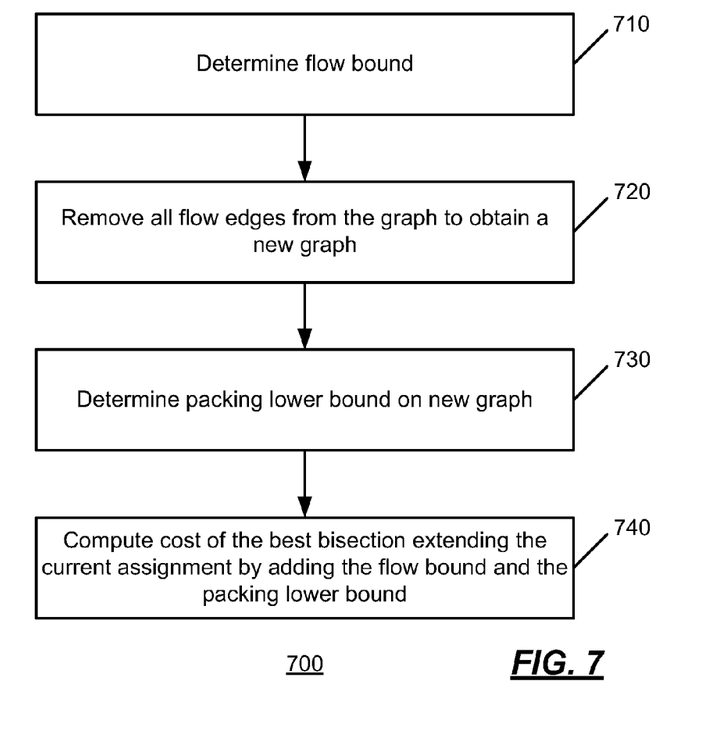
FIG. 7 is an operational flow of an implementation of a method of determining a lower bound.

FIG. 7 is an operational flow of an implementation of a method 700 of determining a lower bound. At 710, compute a flow bound f. At 720, remove the flow edges from graph G, obtaining a new graph $G_f$. At 730, determine the packing lower bound p on $G_f$. At 740, the flow bound and the packing lower bound are added together, f+p, to determine a valid lower bound on the cost of any bisection extending the current assignment (A, B), since there is no overlap between the paths considered by each method (flow and packing).

This technique provides valid lower bounds regardless of maximum flow used, and its packing portion is improved if it has more edges to work with. Therefore, in an implementation, flow may be used with as few edges as possible: instead of using the standard push-relabel approach, an augmenting-path algorithm (such as the known IBFS (incremental breadth first search algorithm)) may be used that greedily sends flows along shortest paths.

In an implementation, forced assignments may be used when the flow bound f followed by an additional packing lower bound p (using the neighbors of B as roots) has already been determined. For a free vertex v, let N(v) be its set of neighbors in $G_f$ (the graph without flow edges), let $\deg G_f(v) = |N(v)|$, and let C be the cell (in the packing partition) containing v. Logical implications may be used to assign v to one of the sides (A or B) without actually branching on it. If it can be shown that assigning v to one side would increase the lower bound to at least match the upper bound, v can be assigned to the other side.

First, consider if v were added to A. Let x(v), the expansion of v, be the number of nontrivial cells (from the packing bound) that contain vertices from N(v). Note that $0 \leq x(v) \leq \deg G_f(v)$. Assigning v to A would create x(v) disjoint paths from A to B, effectively increasing the flow bound to f'=f+x(v). Note, however, that f'+p may not be a valid lower bound, since the new paths may interfere with the "pure" packing bound. Instead, compute a restricted packing lower bound p', taking as trivial the cells that intersect N(v) (they belong to A+). If f'+p' is at least as high as the current upper bound, it is proven that v is assigned to B. In general, this test will succeed when the cells are unevenly balanced (otherwise the increase in flow is offset by a decrease in the packing bound).

Conversely, consider what would happen if v were added to B: C could be split into $\deg G_f(v)$ cells, one rooted at each neighbor of v. The size of each new cell can be computed in constant time, since the subtree sizes are known within the original spanning tree of C. Then recompute the packing lower bound (using the original cells, with C replaced by the newly-created subcells) and add it to the original flow bound f. If this at least matches the current upper bound, then it is proven that v must actually be assigned to A. This works well for trivial cells (the packing bound is unlikely to change for nontrivial ones).

In an implementation, forced assignments may be used when lower and upper bounds are very close. Forced assignments eliminate vertices that are not good candidates for branching.

Figure 8A:
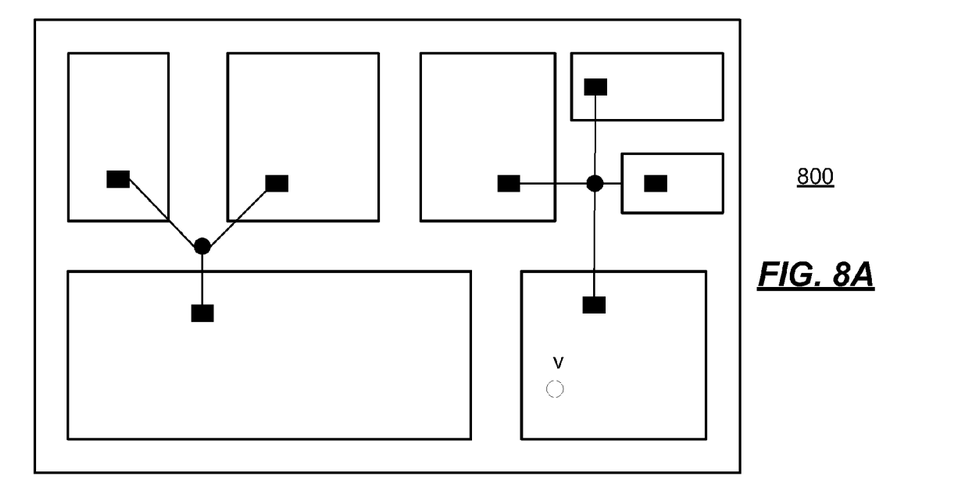
FIGS. 8A-8C are diagrams useful for describing aspects of an implementation of forced assignments.
Figure 8B:
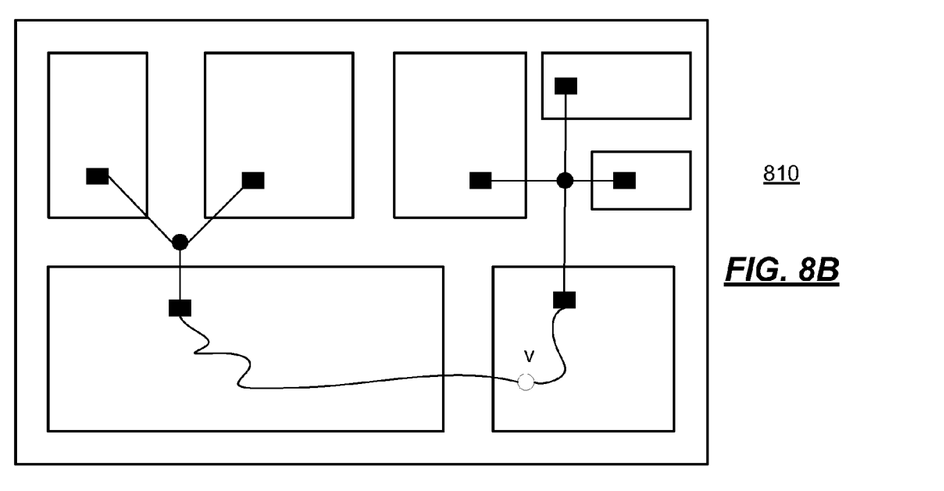
Figure 8C:
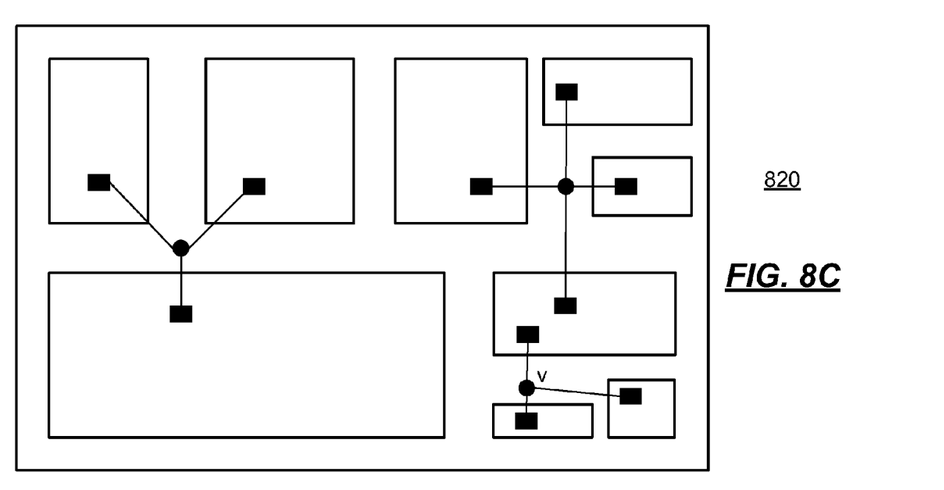

FIGS. 8A-8C are diagrams useful for describing aspects of an implementation of forced assignments. The diagram 800 of FIG. 8A shows the state after initial bounds have been computed (with flow edges already removed). Filled circles belong to B, and v is free. The diagram 810 of FIG. 8B shows that assigning v to A would increase the flow bound. The diagram 820 of FIG. 8C shows that assigning v to B can increase the packing bound by splitting a cell into several ones.

In an implementation, the packing bound may be generalized to handle $\epsilon$-balanced partitions. In this case, cells have size at most $M+=\lceil(1+\epsilon)\lceil n/2\rceil\rceil$ and at least $M-=n-M+$; the packing bound distributes M– vertices instead of $\lfloor n/2 \rfloor$. Weighted vertices may also be taken into account. The packing bound is the minimum number of cells containing at least half of the total weight. When creating the packing partition, attempt to make cells balanced by weight instead of number of vertices; this can be incorporated into the local search. To handle small integral edge weights, parallel edges may be used. Additional extensions, such as arbitrary edge weights or partitions into more than two cells, are possible, but more complicated.

In an implementation, if the lower bound for a given subproblem (A, B) is not high enough to prune it, it may be branched on an unassigned vertex v, creating subproblems (A ∪{v},B) and (A, B ∪{v}). The choice of branching vertices has an impact on the size of the branch-and-bound tree and the total running time. In an implementation, branch on vertices that lead to higher lower bounds on the child subproblems. Given the lower-bounding algorithms, some properties may be inferred that the branching vertex v should have.

The flow and packing bounds benefit from having the assigned vertices evenly distributed (on both sides of the optimum bisection). Since it is not known what the bisection is, a technique is to spread vertices over the graph by branching on vertices that are far from both A and B. This is referred to as the distance criterion. Additionally, branch on vertices that appear in large cells from the packing bound. By branching on a large cell, it may be split, thus improving the packing bound.

To help the flow bound, a large amount of flow may be sent from a branching vertex v to A or B. This suggests branching on vertices that are well-connected to the rest of the graph. A proxy for connectivity is the degree of v, a trivial upper bound on any flow out of v.

In an implementation, one can branch, for example, on the vertex v that maximizes $q(v) = \text{dist}(v) \cdot \text{csize}(v) \cdot \text{conn}(v)^2$, where dist(v) indicates the distance from v to the closest assigned vertex, csize(v) is the size of the cell containing v, and conn(v) is the connectivity (degree) of v. It is contemplated that, in an implementation, other combinations of these measures can be used.

In an implementation, preprocessing involving filtering may be performed. For some graph classes (e.g., road networks), high-degree vertices are often separated by a small cut from the rest of the graph. This makes degrees poor proxies for connectivity. A more robust measure of connectivity may be obtained by using the packing technique described above. For each vertex v, the algorithm may be run with $A=\emptyset$ and $B=\{v\}$ to determine a partition of $V \setminus \{v\}$ into deg(v) cells. If v is well-connected, all cells should have roughly the same size; if not, some cells will be much smaller than others. Computing this bound for every vertex in the graph is expensive, particularly for large road networks.

Instead of explicitly computing the packing bound for every vertex in the graph, a filtering routine may be used to determine if some of the most promising vertices (those with the highest degrees) are actually well-connected to the rest of the graph.

Figure 9:
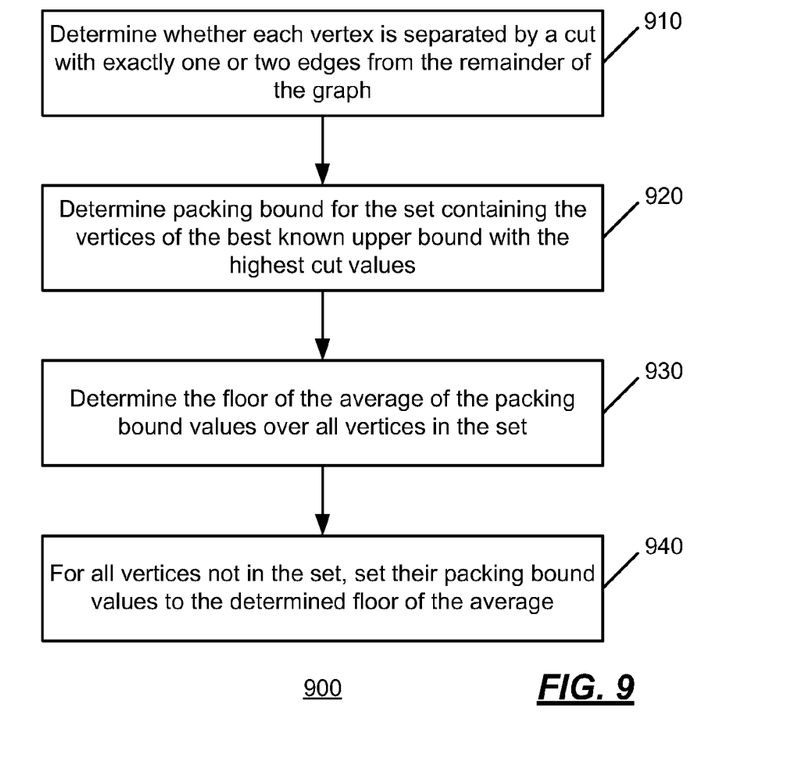
FIG. 9 is an operational flow of an implementation of a filtering method which may be used in graph partitioning.

FIG. 9 is an operational flow of an implementation of a filtering method 900 which may be used in graph partitioning. At 910, determine whether each vertex is separated by a cut with exactly one edge or two edges from the remainder of the graph. Any appropriate known technique may be used to determine the one-cuts (i.e., cuts with exactly one edge) and two-cuts (i.e., cuts with exactly two edges) in the graph. For a vertex v, define cut(v)=1 if it is inside a one-cut of size at most n/10. Otherwise, if v is contained in a two-cut of size at most n/10, let cut(v)=2. For the other vertices v, let cut(v)=deg(v).

At 920, determine the packing bound for the set S containing the 2 U vertices v with the highest cut(v) values (recall that U is the best known upper bound), with ties broken at random. Let pack(v) be the corresponding values. At 930, determine the floor δ of the average value of pack(v) over all vertices v ϵ S. At 940, for the vertices w∉ S, set the packing bound values to the determined floor of the average (i.e., pack(w) =δ).

The branch-and-bound algorithm may then use the standard criterion (dist(v)·csize(v)·conn(v)$^2$) to choose the next vertex to branch on, using a modified definition of connectivity: conn(v)=cut(v)·pack(v).

Contraction may be performed on connected subgraphs in order to branch on entire regions at once. A contraction-based decomposition algorithm is guaranteed to output the optimum solution for any input. In an implementation, the algorithm that determines the minimum bisection of G is as follows. Let U be an upper bound on the optimum bisection. First, partition E into U+1 disjoint sets ($E_0, E_1, \ldots, E_U$). For each subset $E_i$, create a corresponding (weighted) graph $G_i$ by taking the input graph G and contracting all the edges in $E_i$. Then, determine the optimum bisection $U_i$ of each graph $G_i$ independently (for example, using the branch-and-bound algorithm described herein). Finally, return the best bisection thus found. It will correspond to the optimum solution to the original problem.

The decomposition algorithm solves U+1 independent subproblems, but the high-degree vertices introduced by contraction makes each subproblem easier for the branch-and-bound routine. Moreover, the subproblems are not completely independent: they can all share the same best upper bound.

The decomposition algorithm is correct regardless of how edges are partitioned among subproblems, but its performance may vary significantly. To make the subproblems have comparable degrees of difficulty, the edge partitioning algorithm may allocate roughly the same number of edges to each subproblem. The choice of which edges to allocate to each subproblem $G_i$ also matters. The effect on the branch-and-bound algorithm is more pronounced with vertices of higher degree. This may be achieved by making sure the edges assigned to $E_i$ induce relatively large connected components (or "clumps") in G. In contrast, if all edges in $E_i$ are disjoint, the degrees of the contracted vertices in $G_i$ will not be much higher than those of the remaining vertices. Additionally, the shape of each clump matters: its expansion (number of neighbors outside the clump) should be as large as possible.

Figure 10:
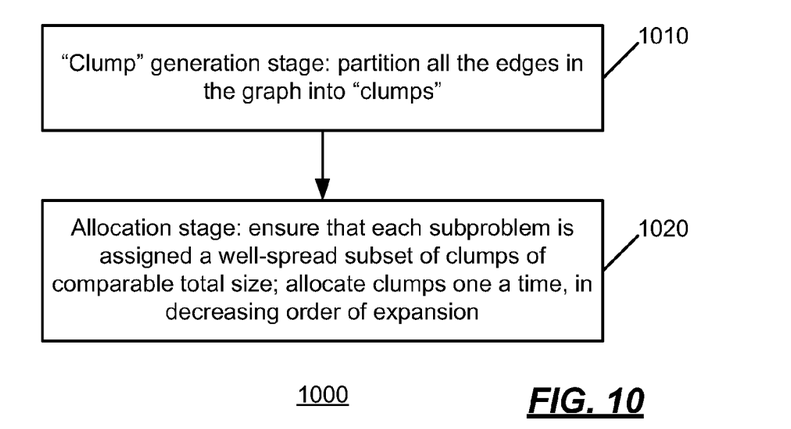
FIG. 10 is an operational flow of an implementation of decomposition method which may be used in graph partitioning.

In an implementation, the decomposition may be performed in two stages. FIG. 10 is an operational flow of an implementation of decomposition method 1000 which may be used in graph partitioning. At 1010, a clump generation stage partitions the edges in the graph into clumps. At 1020, an allocation stage ensures that each subproblem is assigned a well-spread subset of the clumps of comparable total size.

The goal of the generation routine is to build a set F of clumps (initially empty) that partition the edges in the graph. In an implementation, it can do so, for example, by maintaining a set C of candidate clumps, which are not necessarily disjoint and may not include all edges in the graph. The clumps in C are high-expansion subpaths extracted from breadth-first search trees grown from random vertices. Because they minimize the number of internal edges, such paths tend to have high expansion. Once there are enough candidates in C, the algorithm transfers a few clumps from C to the final set F. The clumps are picked from C greedily, according to their expansion, and observing the constraint that clumps in F are edge-disjoint. Once C no longer has suitable clumps with high enough expansion (higher than a certain threshold τ), a new iteration of the algorithm starts: it repopulates C by growing new trees, then transfers some of the resulting candidate clumps to F. The algorithm stops when F is complete, i.e., when every edge in the graph belongs to a clump in F. To ensure convergence, the algorithm may gradually decrease the threshold τ between iterations: initially only clumps with very high expansion are added to F, but eventually even single-edge clumps are allowed.

The allocation phase distributes the clumps to the U+1 subproblems ($E_0, E_1, \ldots, E_U$), which are initially empty. It allocates clumps one at a time, in decreasing order of expansion (high-expansion clumps are allocated first). In each operation, a clump c is assigned to the set $E_i$ whose distance to c is maximum, with ties broken arbitrarily. The distance from $E_i$ to c is defined as the distance between their vertex sets, or infinity if $E_i$ is empty. This ensures clumps are well spread in each subproblem.

Figure 11:
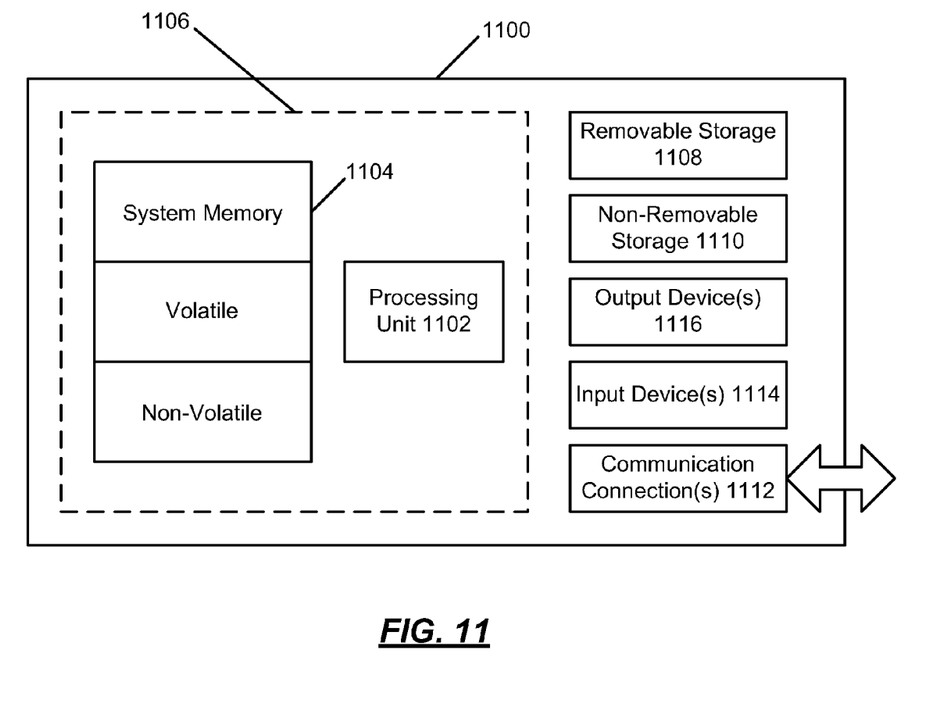
FIG. 11 shows an exemplary computing environment.

FIG. 11 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of computer readable media. Computer readable media can be any available media that can be accessed by computing device 1100 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may contain communications connection(s) 1112 that allow the device to communicate with other devices. Computing device 1100 may also have input device(s) 1114 such as a keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for graph bisection, comprising:
   receiving as input, at a computing device, a graph comprising a plurality of vertices and a plurality of edges;
   generating a plurality of subproblems using the graph, by the computing device;
   determining a graph bisection using the subproblems, by the computing device, wherein determining the graph bisection comprises:
   determining an optimum balanced bisection of the vertices of the graph using a tree; and
   pruning the tree using a packing lower bound; and
   outputting the graph bisection.

2. The method of claim 1, wherein generating the subproblems using the graph comprises decomposing the graph into the subproblems.

3. The method of claim 2, further comprising filtering the subproblems prior to determining the graph bisection using the subproblems.

4. The method of claim 1, wherein determining the graph bisection using the subproblems comprises solving the subproblems independently.

5. The method of claim 1, wherein determining the graph bisection using the subproblems comprises using a branch-and-bound technique.

6. The method of claim 5, wherein the branch-and-bound technique generates the tree.

7. The method of claim 6, further comprising determining the packing lower bound.

8. The method of claim 7, further comprising reducing the tree using a forced assignment.

9. A system for graph bisection, comprising:
   at least one computing device; and
   a graph bisection component that receives as input a graph comprising a plurality of vertices and a plurality of edges, generates a plurality of subproblems using the graph, determines a graph bisection using the subproblems, and outputs the graph bisection,
   wherein determining the graph bisection comprises determining an optimum balanced bisection of the vertices of the graph using a tree, and pruning the tree using a packing lower bound.

10. The system of claim 9, wherein generating the subproblems using the graph comprises decomposing the graph into the subproblems.

11. The system of claim 10, wherein the graph bisection component filters the subproblems prior to determining the graph bisection using the subproblems.

12. The system of claim 9, wherein determining the graph bisection using the subproblems comprises solving the subproblems independently.

13. The system of claim 9, wherein determining the graph bisection using the subproblems comprises using a branch-and-bound technique.

14. The system of claim 13, wherein the branch-and-bound technique generates the tree.

15. The system of claim 14, wherein the graph bisection component determines the packing lower bound.

16. The system of claim 14, wherein the graph bisection component reduces the tree using a forced assignment.

* * * * *